Nov. 29, 1960 A. J. BELISLE 2,961,726
DEVICE FOR CONNECTING AND ADJUSTING THE ENDS OF CABLES
Filed April 28, 1959
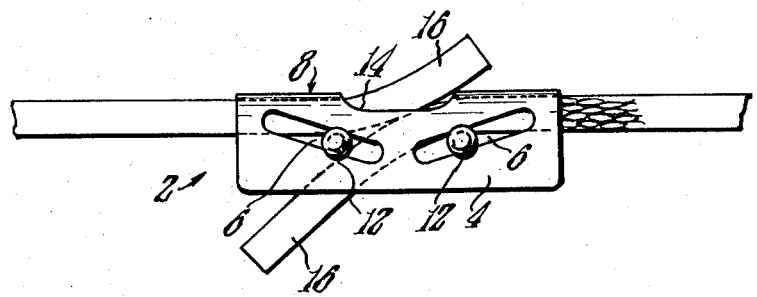
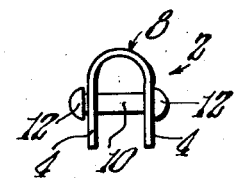 
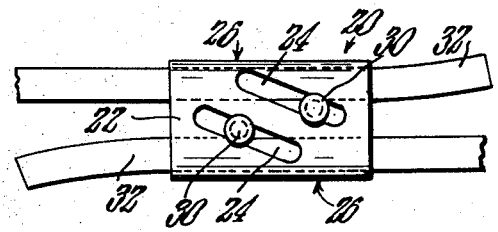 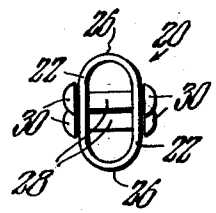
INVENTOR.
Adelard J. Belisle.
BY

United States Patent Office 2,961,726
Patented Nov. 29, 1960

2,961,726

DEVICE FOR CONNECTING AND ADJUSTING THE ENDS OF CABLES

Adelard J. Belisle, 11 Dartmouth St., South Hadley Falls, Mass.

Filed Apr. 28, 1959, Ser. No. 809,445

1 Claim. (Cl. 24—126)

This invention relates to a device for connecting and adjusting end portions of a flexible cable, and is directed more particularly to a device for adjusting and connecting the free ends of a clothesline which extends around spaced apart pulleys.

The principal objects of the invention are directed to a device which is adapted and arranged to grip automatically and to hold the free ends of a cable such as a clothesline so as to maintain the desired tautness therein.

Devices of the type to which the invention relates usually have one end of a line tied or knotted or otherwise secured thereto, but such is objectionable.

According to the novel device of this invention, opposite free ends of a line are independently and releasably secured thereby. Adjustments in the tautness of the line may be easily and readily accomplished by manipulation of either one or both of said free ends of the line.

The invention resides in the particular arrangement, construction and relationship of the various elements of the device for connecting end portions of a flexible cable as exemplified in the detailed disclosure hereinafter set forth wherein the objects of the invention as defined in the paragraphs below will be apparent.

Another of the primary purposes hereof is to provide advantageous structural and operational features in a device of the class to which reference has been made leading to its simplicity in construction, its adaptability to economical manufacture and its efficiency and dependability in operational use, and providing important distinct advantages in durability, efficiency, ease of operation and the like.

Other objects and advantages of the present invention will be in part obvious or in part pointed out more fully hereinafter. All will become apparent as the detailed description of the exemplary form of the invention proceeds below, it being understood that the invention consists substantially in the combination, construction, location and relative arrangement of parts, all as described in detail hereinafter as shown in the accompanying drawing, and with particularity in the appended claim forming a part hereof.

In the accompanying drawing forming part of this specification and which illustrates, by way of example, the principle of the invention and the best mode, which has been contemplated, of applying that principle by way of a construction in accordance therewith, wherein like characteristics of reference or numerals are employed to designate like or corresponding parts throughout the several views:

Fig. 1 is a side elevational view of a device for connecting the free ends of a line;

Fig. 2 is an end elevational view of the device shown in Fig. 1;

Fig. 3 is an end elevational view of one of the pins of the device shown in Figs. 1 and 2;

Fig. 4 is a view, similar to Fig. 1, showing another form of the invention; and

Fig. 5 is an end elevational view of the device shown in Fig. 4.

Referring now to the drawings more in detail, the novel features of the invention will be fully described.

An elongated holder is represented by 2, in Figs. 1 and 2, which in transverse cross section is in the shape of a U, as clearly shown in Fig. 2, and has transversely spaced opposite side walls 4, and a longitudinal connecting edge wall 8.

Said opposite side walls 4 are each provided with corresponding elongated slots 6, which relatively diverge outwardly from a point intermediate the ends of the holder, and terminate inwardly of the wall 8 of the holder.

Pins or studs 10 extend between the walls 4 of the holder and have opposite end portions slidable in the slots 6. Said pins, as shown, are provided with heads 12 which are disposed outside the walls 4 to prevent displacement of the pins from the slots 6.

The wall 8 of the holder intermediate opposite ends thereof is provided with an elongated slot or opening 14, as shown in Fig. 1.

Free end portions of a cable or clothesline are represented by 16. It will be assumed that said line is supported by and extends around spaced apart pulleys or the like. Said ends are to be connected and relatively adjusted to provide the desired tautness in the line.

The end portions 16 of the line are passed inwardly of the holder, each between a pin 10 and the wall 8 of said holder. One of said end portions 16, or both for that matter, may extend outwardly through the slot 14, if desired.

To produce the desired tautness in the line, the end portions 16 are pulled in opposite directions towards one another. The pins 10 engage and impinge the inner side of the line portions to press them against the wall and prevent movement of the line outwardly from the holder.

Strains on the line at either side of the holder cause the pins to more securely grip and bind said line portions against the wall 8 thereby to prevent displacement of the line ends from the holder and to hold the line in the desired taut condition.

The pins 10 may be knurled or otherwise roughened, as in Fig. 3, to enhance the gripping function of said pins.

According to the form of the invention shown in Figs. 4 and 5, a holder 20 is in the form of an elongated tube, which may be somewhat flat in cross section, as shown in Fig. 5.

Opposite side walls 22 of the holder are provided with aligned slots 24. The slots in each side wall are in parallelism and are disposed angularly relative to the longitudinal edge wall 26 of the holder, as shown in Fig. 4.

Pins 28 are slidable in the slots 24, and are provided with heads 30, as are the pins 10, previously described. The pins may be knurled or roughened, as shown in Fig. 3, should that be desired.

End portions of a line are represented by 32, and each is passed through and lengthwise of the holder between an edge wall 26 and a pin 28, as shown.

The end portions 32 of the line are pulled in opposite directions or towards one another to provide the desired tautness in the line. When released the pins engage and impinge the line, and are moved in the slots to bind the line ends against the walls 26.

Thus the line ends are locked against movements outwardly of the holder, by strains on the line.

In the forms of the invention shown and described, with the pins engaging or impinging the line, pulling forces or strains on the line tending to pull the line ends from the holder are resisted by the binding or clenching of said line ends against the longitudinal edge walls of the holder by the pins.

The angularity of the pin slots relative to the direction of pull of the line away from the holder is such that the binding and clenching action of the pins increases accordingly as pulling forces on the line increase thereby to insure adequate clamping of the line ends in the holder.

Without further analysis, the foregoing is intended to so fully reveal the gist of my invention and the construction and operation of the device thereof that others can, by applying current knowledge, readily adapt it for various applications without omitting features which, from the standpoint of prior art, fairly constitute essential characteristics of the generic or specific aspects of this invention. The substitution of equivalents and other modifications are contemplated, as circumstances may suggest or render expedient, since the invention is susceptible of various changes and modifications without departing from the real spirit or underlying principles of the invention. In other words, it is not desired to limit the invention to the exact construction shown and described as the objects of the invention may be attained by the use of constructions different in certain respects from that disclosed.

The following claim is desired to include within the scope of the invention all such suitable variations, modifications and equivalents by which substantially the results of the invention may be obtained through the use of substantially the same or equivalent devices or means.

Accordingly, limitation of this invention should be made only as determined by a proper interpretation of the terms used in the subjoined claim.

It is intended to claim the invention, broadly as well as specifically, as indicated by the appended claim.

What is claimed as new and useful is:

In a device for clamping the free ends of a clothesline or the like against outward separation therefrom comprising, an elongated holder having a transverse cross section in the form of a U providing transversely spaced side walls and a connecting edge wall, said edge wall being provided with an opening therethrough for the passage outwardly therethroug of line ends, and said side walls being provided with elongated slots extending in relatively diverging relation from a point intermediate opposite ends of said walls towards said edge wall, pins extending between said walls having opposite ends slidable in said slots adapted to engage and clamp line ends to said edge wall.

References Cited in the file of this patent

UNITED STATES PATENTS

| | | |
|---|---|---|
| 1,518,523 | Kubik | Dec. 9, 1924 |
| 2,401,418 | Everley | June 4, 1946 |

FOREIGN PATENTS

| | | |
|---|---|---|
| 951,923 | Germany | Nov. 8, 1956 |